United States Patent [19]
Valverde

[11] Patent Number: 5,149,012
[45] Date of Patent: * Sep. 22, 1992

[54] TURBOCRAFT

[76] Inventor: Rene L. Valverde, 4405 Toledo St., Coral Gables, Fla. 33146

[ * ] Notice: The portion of the term of this patent subsequent to Aug. 13, 2008 has been disclaimed.

[21] Appl. No.: 757,326

[22] Filed: Sep. 10, 1991

[51] Int. Cl.$^5$ .............................................. B64C 39/06
[52] U.S. Cl. .................................. 244/12.2; 244/23 C; 244/53 R; 244/60; 244/12.3
[58] Field of Search ................... 244/12.2, 23 C, 12.3, 244/23 R, 52, 60, 62, 17.19, 12.1, 36, 53 R

[56] References Cited

U.S. PATENT DOCUMENTS 3,020,003 2/1962 Frost et al. .................. 244/23 C

*Primary Examiner*—Galen Barefoot
*Attorney, Agent, or Firm*—Oltman and Flynn

[57] ABSTRACT

An aircraft having a substantially circular body having a profile in the direction of flight as a profile of an airplane wing, at least two concentric counter-rotating turbo-blade assemblies within said body for effecting a vertical lifting air stream through said assemblies. Power generating devices and devices for coupling the power generating devices to the turbo-blade assemblies for maintaining them in rotary motion. It also includes thrusting devices coupled to the power generating devices for applying horizontal thrust to the aircraft, retro-boosting devices including a plurality of combustion chambers located below the turbo-blade assemblies for boosting said vertical lifting airstream. Also included is a compressed air plenum disposed below said turbo-blade assemblies in fluid communication with the combustion chambers and to the intake portion of the power generating means for supplying oxygen for sustaining combustion in said combustion chambers and for sustaining power in said power generating means, including upper vanes disposed above said turbo-blade assemblies for ingesting air, and lower vanes disposed below said compressed air plenum for exhausting air, and respective upper and lower vane control means.

24 Claims, 13 Drawing Sheets

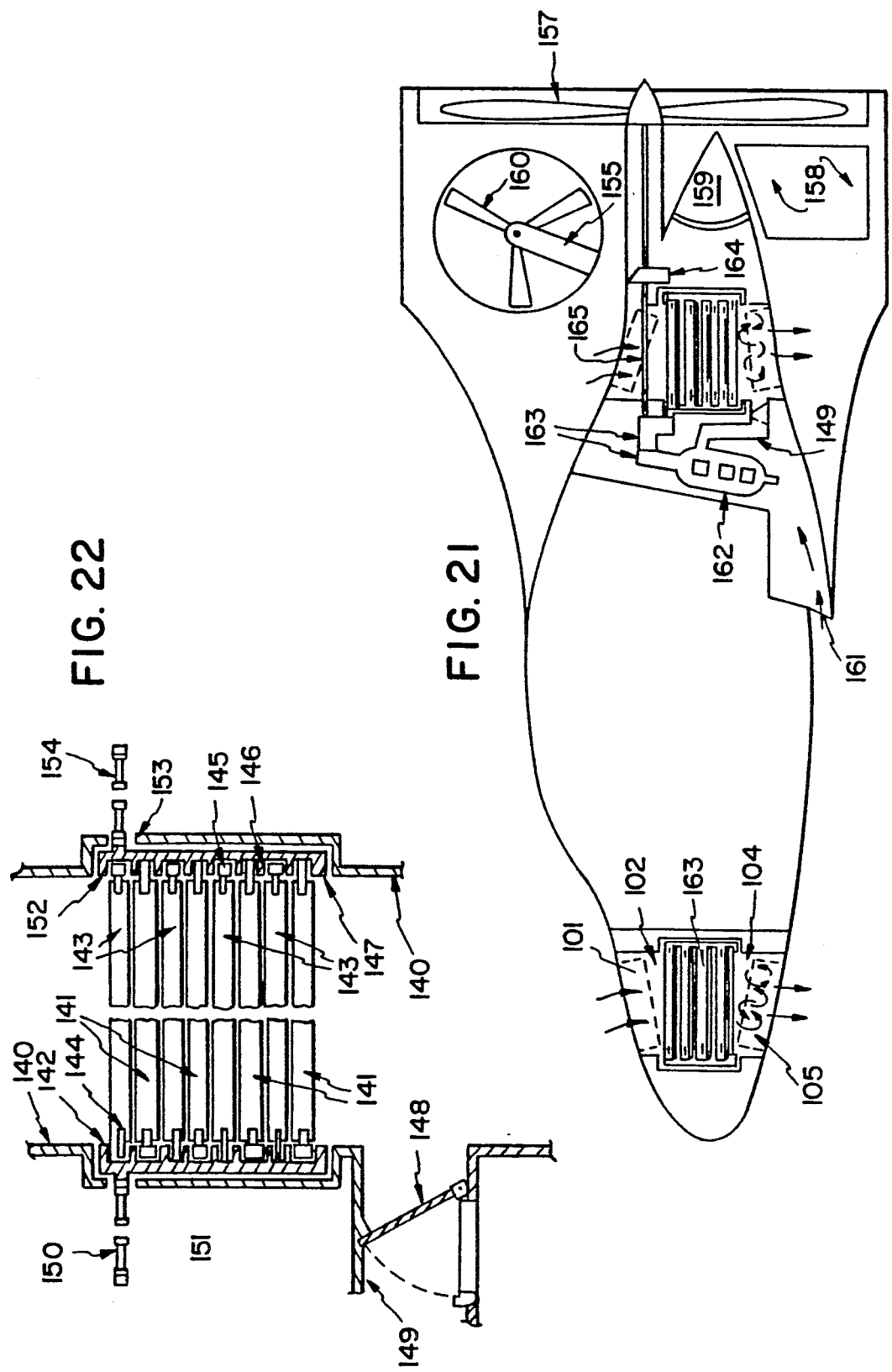

FIG.26
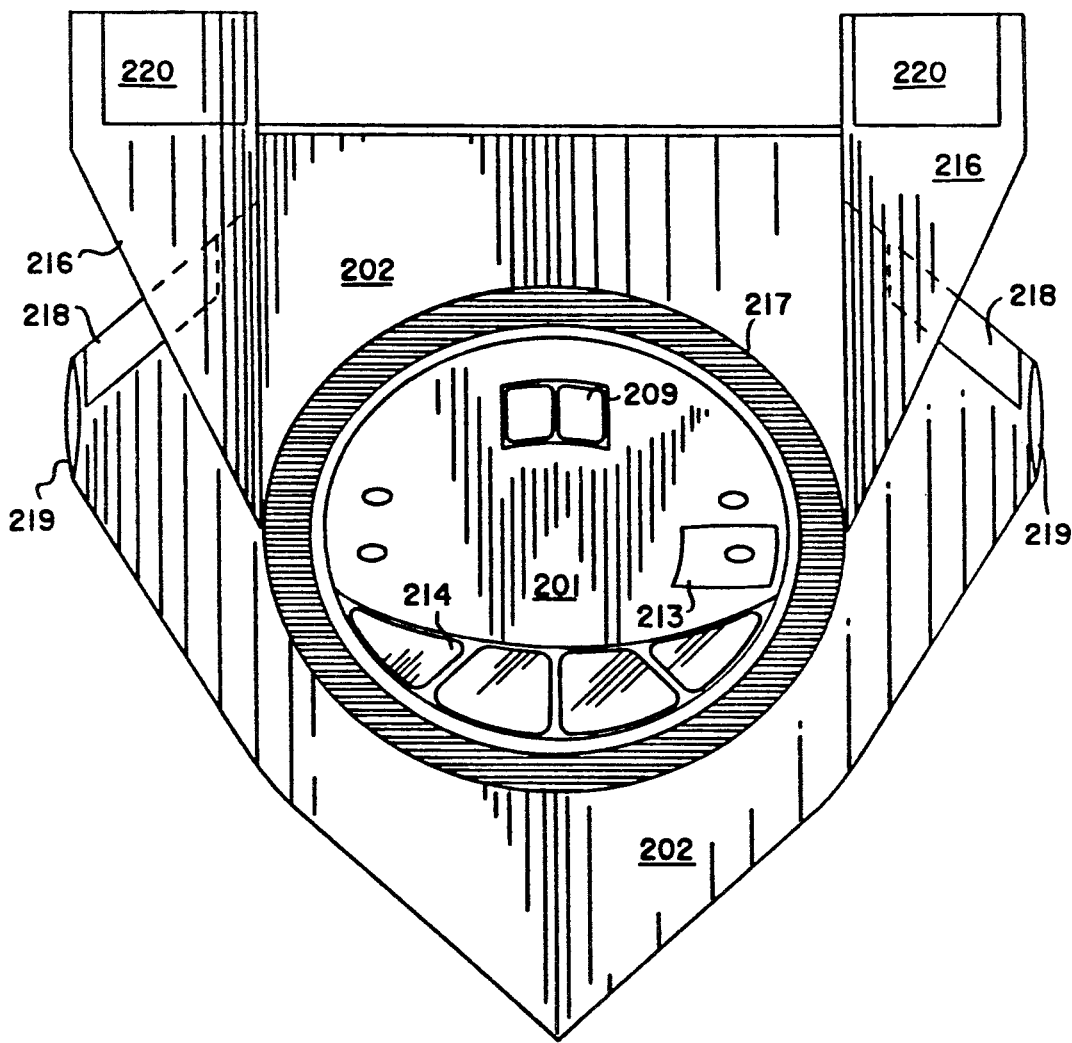
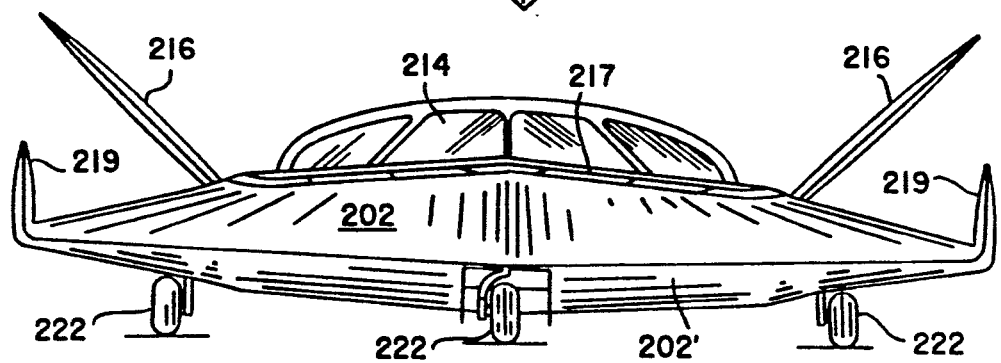
FIG.27

TURBOCRAFT

The invention relates to a lifting device to lift vehicles from the ground and help them travel through air. Lift is generated by rotating a number of blades with an airfoil section around a circle with enough angular velocity to produce the required lift force capable of lifting the vehicle that contains it.

BACKGROUND OF THE INVENTION

The conversion of energy to effect a translational motion through air is well known in the prior state of the art. Aviation has evolved from simple flying machines early in this century to supersonic flight and rocketry flying beyond the confines of our planet. However, as aviation traffic increases, the number of accidents and near misses increases too. The configuration of present day aircrafts make them vulnerable to the action of thunderstorms and wind shears. In addition, their dynamic stability and balance are heavily compromised and jeopardized when a shift of the center of gravity due to an improper loading arrangement or flight attitude occurs. The recent increase in the size of terminal control areas reduces the freedom of flight by general aviation and intensifies the labor force required to effect adequate traffic separation.

The instant invention provides a novel method of flying in that the counter rotation of airfoil shaped blades is arranged in tandem or side by side or even in a plurality of stages and moving around the outer edge of a saucer shaped vehicle to raise it above ground, and, in effect is capable of attaining a high angle of climb or descent.

This characteristic would render obsolete the present day, essentially flat, takeoff and landing patterns which in turn require very large terminal control areas and runways. In addition, it will allow the reduction in size of present day airports, and along with it a corresponding lessening of the danger of midair collisions, reduction in size of terminal control areas and increases in handling capacity of airports.

In addition, the structurally compact configuration of the instant invention will allow it to resist heavier wind loads, reducing the danger of structural collapse and disintegration in midair when hit by thunderstorms.

SUMMARY OF THE INVENTION

The instant invention is in effect similar to the present day helicopter in the sense that it has rotors (turbo-blades) that turning around an axis generate the required lifting force to provide an airborne condition. However, a helicopter rotor is a long cantilevered blade attached to an axis and afflicted by inherent disadvantages such as:
1. Structural fatigue of the metal due to continuous repetitive cycles of stress reversal,
2. Inefficiency of lifting power of the rotor as it approaches the axis of rotation,
3. Severe limitations as to its service ceiling and cruising speed due to its high wind loading, and
4. Continuously variable eccentricity between the center of lift and the center of gravity of the vehicle.

The instant invention removes the first three disadvantages almost in their entirety and reduces the fourth to a substantial degree.

In addition, the mechanical design of the instant invention allows it to gradually shift from total lifting power to total thrusting power and vice versa. This condition would allow it to climb to its assigned flying altitude and as it reaches it, it gradually shifts from climbing to thrusting power until it attains the desired cruising speed.

In a further developed of the invention there is provided an aircraft having a body which has a profile in direction of flight as a profile of an airplane wing. It has within its body two concentric counter-rotating turboblade assemblies for effecting a vertically downwardly directed air stream. Through aforesaid assemblies power generating means and coupling means are provided for coupling power from the power generating means to the turboblade assemblies for maintaining them in rotary motion. The aircraft also includes thrusting means coupled to the power generating means for effecting horizontal thrust to the aircraft, and retro-boosting devices including a plurality of combustion chambers located below and/or to the rear of the turboblade assemblies for boosting the downwardly directed air stream.

According to a further feature of the invention there is provided a compressed air plenum disposed below the turboblade assemblies which is in fluid communication with the aforesaid combustion combustion chambers, with an intake port of the power generating means, with the lower exhaust air vanes and with rear exhaust air openings for supplying oxygen for sustaining combustion in the combustion chambers, for sustaining combustion in the power generating means, and for provided a vertical lifting force through the lower exhaust air vanes, and for providing a horizontal thrusting force through the rear exhaust air openings.

The aircraft according to the invention further includes upper vanes disposed above the turboblade assemblies for ingesting air, and still further includes respective upper and lower vane rear opening control means.

It is an object of this invention to provide an improved energy conversion system.

It is another object of this invention to provide a system that can be installed within a vehicle in such a manner that it could pivot around any of three axes and in so doing move the vehicle forward, backward, upward, downward and/or sideward much in the same way as aircrafts, rotor crafts or any combination of them could achieve as they exist in the present state of the art, and further to improve on any such motions and if necessary with the air of electronic devices attain complete control of attitude of such vehicle within the atmosphere to carry passengers and/or cargo between geographical points on Earth.

Other objects of this invention will appear from the following description and appended claims, reference being had to the accompanying drawings forming a part of this specification wherein like reference characters designate corresponding parts in the several views.

BRIEF DESCRIPTION OF DRAWINGS

FIG. 21 shows a longitudinal cross section of the piston-propeller propulsion configuration at a larger scale than FIG. 10;

FIG. 22 shows a detail of the counter-rotating turbo-blade compressor in the tandem configuration.

FIG. 26 is a plan top-down view of the invention showing various features of the upper surfaces of the aircraft, including transversely oriented intake air vanes.

FIG. 27 is an elevational front view of the invention according to FIG. 26.

DESCRIPTION OF THE PREFERRED EMBODIMENTS

The instant invention is basically a combination of an airplane and a helicopter.

The Wing

As an airplane, the instant invention contains the necessary and sufficient elements for it to fly.

Figure 2:
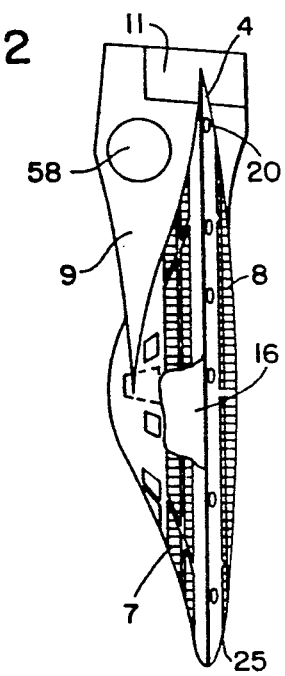
FIG. 2 shows a side elevation.
Figure 4:
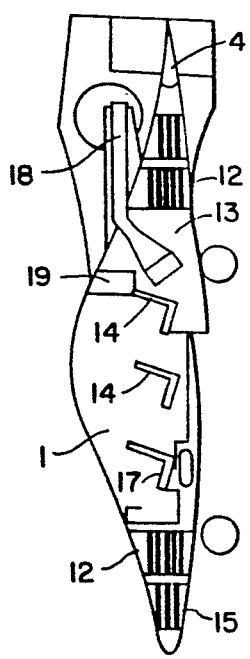
FIG. 4 shows a longitudinal cross section.
Figure 5:
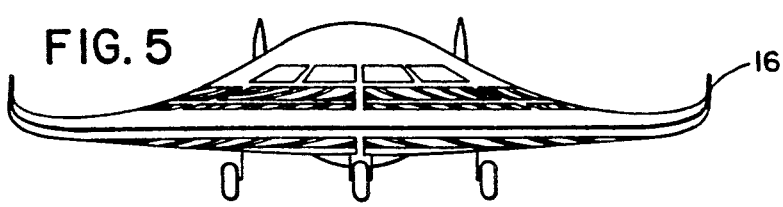
FIG. 5 shows a front elevation.

FIGS. 2 and 4 show that the profile of this vehicle has an aerodynamic shape similar to the wing of an airplane, and, consequently capable of generating lift. It is in effect a flying wing. Laterally disposed winglets 16 have been added at the periphery span ends of the wings in order to improve its efficiency.

Shown on FIGS. 1 through 6 are the balance of basic elements required for an airplane to fly, namely ailerons (3), rudder assembly (5) and tail [elevator] (4). The cabin (1) is located at the center of the vehicle with seats for pilot and copilot (17) at the front and the passenger seats (14) distributed elsewhere within the space. At the rear of the passenger area is an engine compartment (13) and on each side of its luggage space (19) with landing gear space (22) under it. Fuel tanks are located around the outer circumference (2). The gas turbine's exhaust shroud (6) is located in back of the cabin enclosing the engine exhaust jet nozzles (18). The air intake (23) is shown on FIG. 6 along with the lower vanes (24) and the retro-boosting jet nozzles (21).

The circular configuration of this vehicle generates a very large wing area and reciprocally a very small wing loading relative to an airplane of similar weight. This means that the vehicle can float in air much better than a comparable airplane. The altitude that can be attained by an airplane in inversely proportional to its wing loading. Therefore, if assisted by enough generating power the airplane according to the instant invention can attain higher flying levels than a comparable airplane.

It is recognized that because of its configuration, total drag (a function of frontal area plus exposed surfaces) generated by this vessel could be higher than a comparable airplane of similar weight. This condition would tend to reduce its cruising speed relative to a comparable airplane when flying at the same altitude. However, since air density diminishes with altitude at a logarithmic rate while the total drag area ratio is constant, a small increase in the service ceiling would suffice in order that both drag forces become equal. Therefore, in attaining a sufficiently higher flying level, total drag generated by this vehicle would be less than that of a comparable airplane. At that point its cruising speed would be greater.

The Turbo-Blade Systems

As a helicopter, the instant invention contains also all necessary elements for it to climb, hover and fly.

Figure 3:
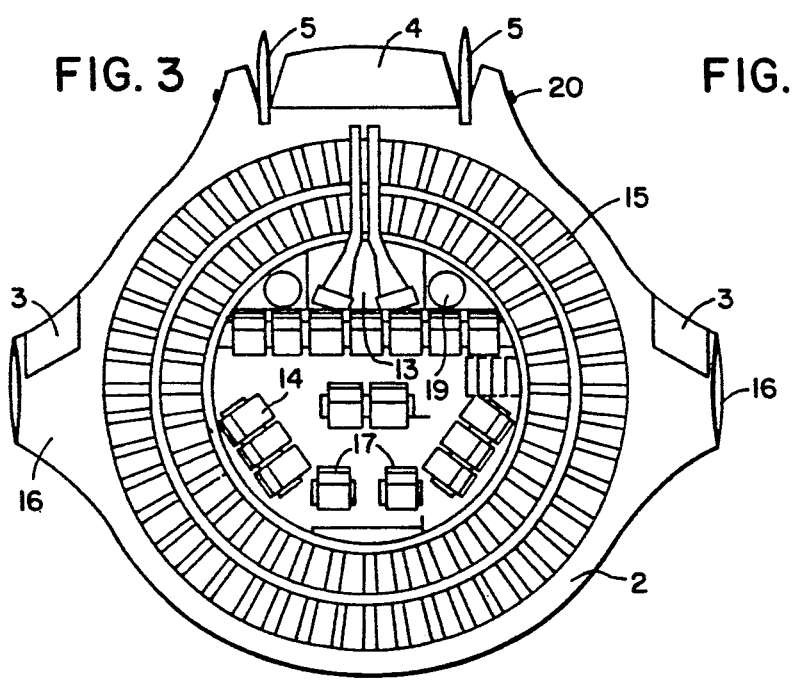
FIG. 3 shows a horizontal cross section.

FIG. 3 shows a horizontal cross section of the instant invention. A plurality of turbo-blades (15) are arranged within two circles. The inner circle blade set rotates in one direction while the outer circle blade set rotates in the opposite direction. This arrangement is herein called side by side. In the tandem arrangement there would be only one circle within which two sets of blades would rotate. One set would rotate counter to the other, both being vertically separated. A plurality of sets could be built with either arrangement. As in a steam turbine a number of fixed blades could be introduced between blade stages in order to redirect the air flow from one blade stage to the next one.

The advantage of these systems as compared to that of the helicopter are summarized as follows:

1. Each blade is supported at each end like a simple supported beam, as compared with the cantilevered beam concept of the helicopter rotor. No high stress nor stress reversal would exist under this condition but only normal working stress-strain cycles. Given a conservative section modulus to span ratio, the useful life of a blade can be extended indefinitely.

2. A blade's high aspect ratio coupled with its confined end condition will render it a very efficient lifting device. Located at or near the outer edge of the circle that embodies the instant invention's frame, each set of blades develops lift while avoiding the inherent aerodynamic inefficiency of the helicopter's rotor as it approaches its center of rotation.
3. Given its conceptual configuration, the total turbo-blade area of the instant invention can easily double the total rotor area of a similar weight helicopter. When its higher aerodynamic efficiency is added, the resulting lower wing loading will render a powerful lifting platform capable of climbing at a high angle and rate of climb, faster, and sustaining a higher service ceiling than the comparable helicopter.
4. The total drag produced by the projected frontal and exposed surfaces of the turbo-blade assembly of the instant invention is less than that produced by the combined rotor assembly plus fuselage surfaces of the compared helicopter. Therefore, given the same amount of power applied, the linear velocity attained by the instant invention's turbo-blade assembly will be greater than that of the helicopter rotors with the same amount of total drag generated by each. Hence, since lift is a direct function of the linear velocity of the blade, the total lifting power of the turbo-blade assembly will also be higher than that of a comparable helicopter.
5. The counter rotating effect of the turbo-blade system coupled with its location around the outer portions of the circular airframe tends to neutralize the vibrating effect of the variable lifting force pattern. This neutralizing effect compares favorably with the vibration generated by the single rotor system of a comparable helicopter.

The transmission of power between the jet engines and the turbo-blade system may be attained either by transferring the shaft rotating energy of fan-jet engines through mechanical means to the turbo-blades or by diverting the hot air jets of the jet engines through exhaust manifolds to the turbo-blade assembly.

The Lifting Vanes and Yaw Control Systems

In order to convert the instant invention from a climbing attitude to a translational condition it is necessary to operate upper and lower vane system. These systems are shown on FIGS. 1, 2 and 5 (7), and on FIGS. 6 (24).

For the rotating turbo-blade system to operate as a helicopter, it is necessary that air flow through them freely. Consequently the upper and lower surface of the wing comprising the area where the turbo-blade system is located, is open to the air. On the other hand, for this vehicle to operate as an airplane, air gas must flow uninterruptedly along the upper and lower surface of the wing.

Figure 1:
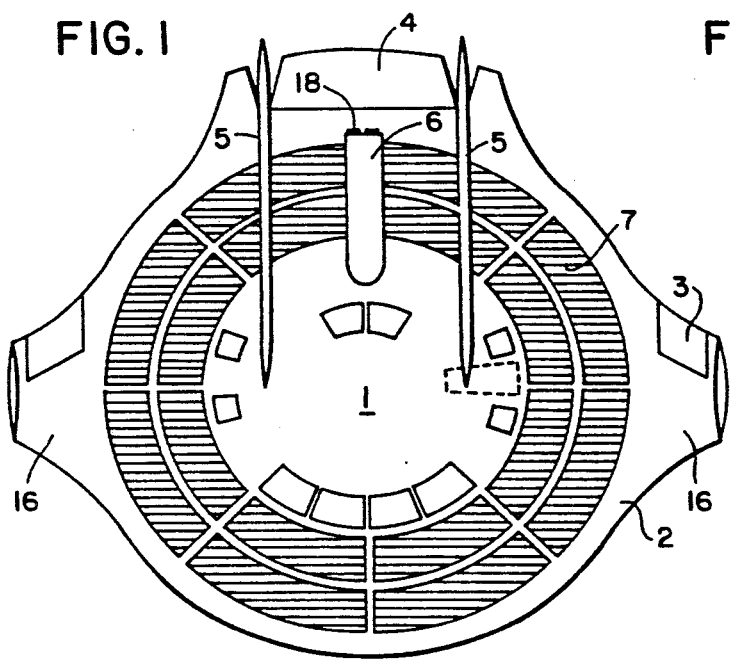
FIG. 1 shows a plan view of the invention in turbojet propulsion configuration.
Figure 6:
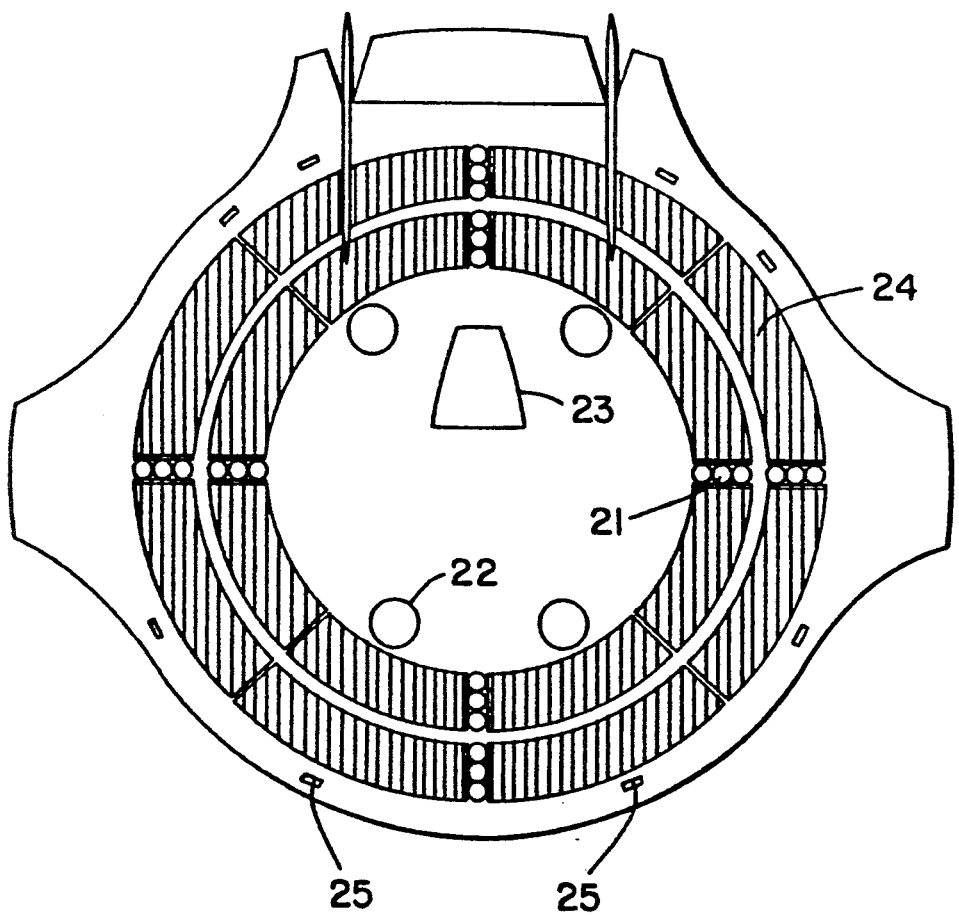
FIG. 6 shows a bottom view.
Figure 7:
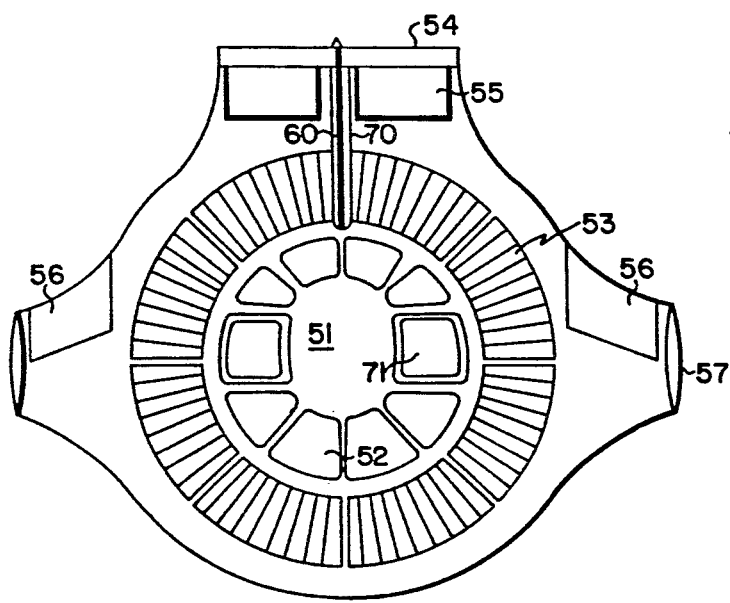
FIGS. 7 shows a piston-propeller propulsion configuration of the instant invention.
Figure 8:
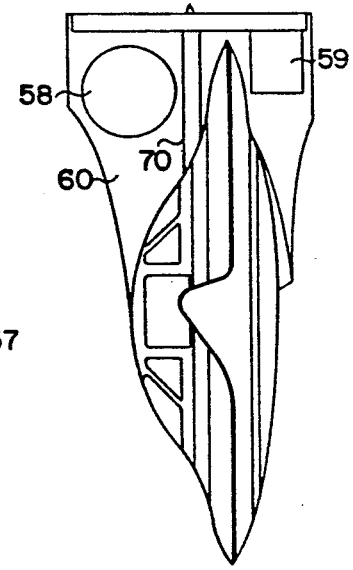
FIG. 8 shows a side elevation of the configuration according to FIG. 7.
Figure 9:
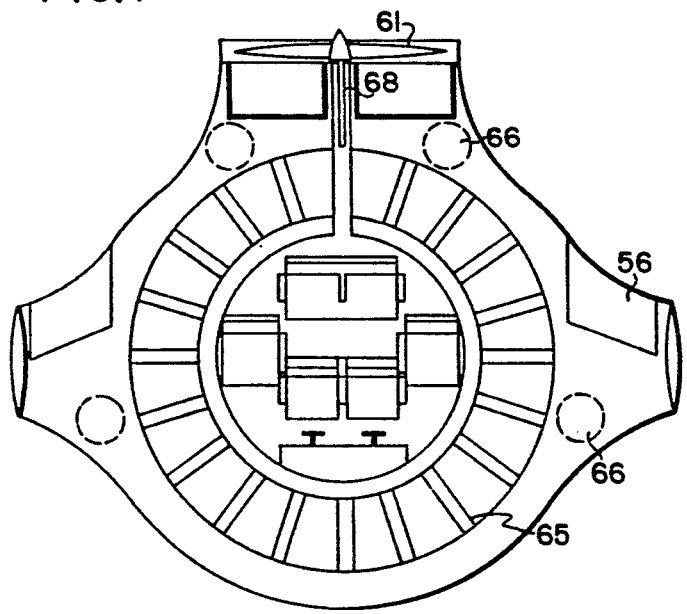
FIG. 9 shows a horizontal cross section of the configuration according to FIG. 7.
Figure 10:
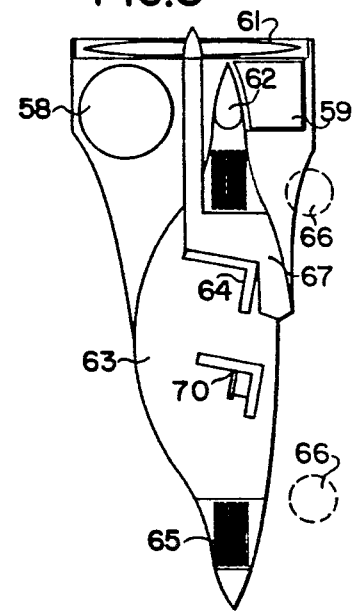
FIG. 10 shows a longitudinal cross section of the configuration according to FIG. 7.
Figure 11:
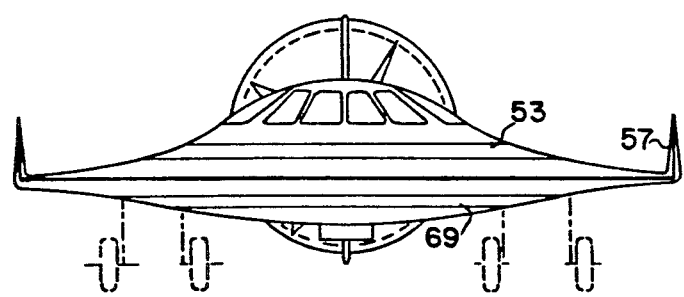
FIG. 11 shows a front elevation of the configuration according to FIG. 7.

The upper and lower vane systems are a series of thin flat metal pieces rotatable about a longitudinal axis and installed on the upper and lower surface of the vehicle above and below the turbo-blade system. FIG. 1 shows the lifting vanes 7 arranged parallel to each other and perpendicular to the line of flight. FIG. 6 shows them (24) arranged parallel to each other and parallel to the line of flight. A radial arrangement, FIG. 7, may also be made wherein each vane (53) will have a radial configuration.

The yaw control system, used mainly while the vehicle is under a hovering attitude may consist of either one of the following two systems:

Propeller driven

This system consists of one or two propellers 58 installed in the rudder assembly as shown in FIG. 2. Enough power must be diverted from the engines, or generated through an independent source to activate the propellers and balance the yaw producing torque of the counter rotating turbo-blade systems.

Jet Driven

This system consists of exhaust jet nozzles 20 placed on an angle with the longitudinal axis of the vehicle and located on the exterior face of the horizontal stabilizer as shown in FIG. 2. Power must be diverted from the engines to activate either one with enough force to balance the yaw producing torque of the counter rotating turbo-blade systems.

The Retro-Boosting System

In addition to the turbo-blade system the instant invention can be fitted with a system that will increase its climbing power. It can be called a retro-boosting system 21. See FIG. 6. The turbo-blade system is in effect similar to a multi-stage turbine. It will compress the air entering from above through the upper lifting vane 57. As it leaves the last stage a portion of this compressed air will be guided into combustion chambers 169 (FIG. 12) where it will be mixed with fuel and ignited with the resulting hot gases exhausted into the air below. It is recognized that the design of a jet engine is well known in the prior state of the art, therefore no attempt is made herein to include the design details of the retro-boosting system as part of these specifications. However, the concept of its use in the manner described herein and shown on FIG. 6 as boosters 21 is made a part of this invention. A plurality of these boosters 21 may be installed within the compressed air plenum housing and used to shorten the climbing period until the desired cruising level is attained.

The Multi-Directional Control System

Heretofore, the aircraft of the instant invention has been shown to be capable of climbing, hovering, flying forward, turing and descending. This maneuvering capability means that it can roll, pitch and yaw at the discretion of the command pilot. However, in order to achieve complete directional control it is necessary that in addition, the aircraft be capable of moving sidewards and/or backwards while in a hovering attitude. By diverting some of the power of the jet engines into a plurality of nozzles located around the circumference of the vehicle, much in the same way as the jaw control nozzles are located, and spaced appropriately between each other, FIGS. 2 and 6 (25), it is possible by firing two or even three nozzles at a time to attain complete motion control in all directions in a horizontal plane.

Compressed Air Plenum

A compressed air plenum provides additional precompressed air (and consequently oxygen) to the turbofan and/or turbojet engine system in order for them to provide sufficient power to fly at higher altitudes than those attained by the present state of the art aircraft. The reason is that an increase in power will be obtained from the jet engine system if additional oxygen is supplied to it at the point of its maximum service ceiling.

This condition will translate into an increase in both the service ceiling and cruising speed of the aircraft.

Figure 12:
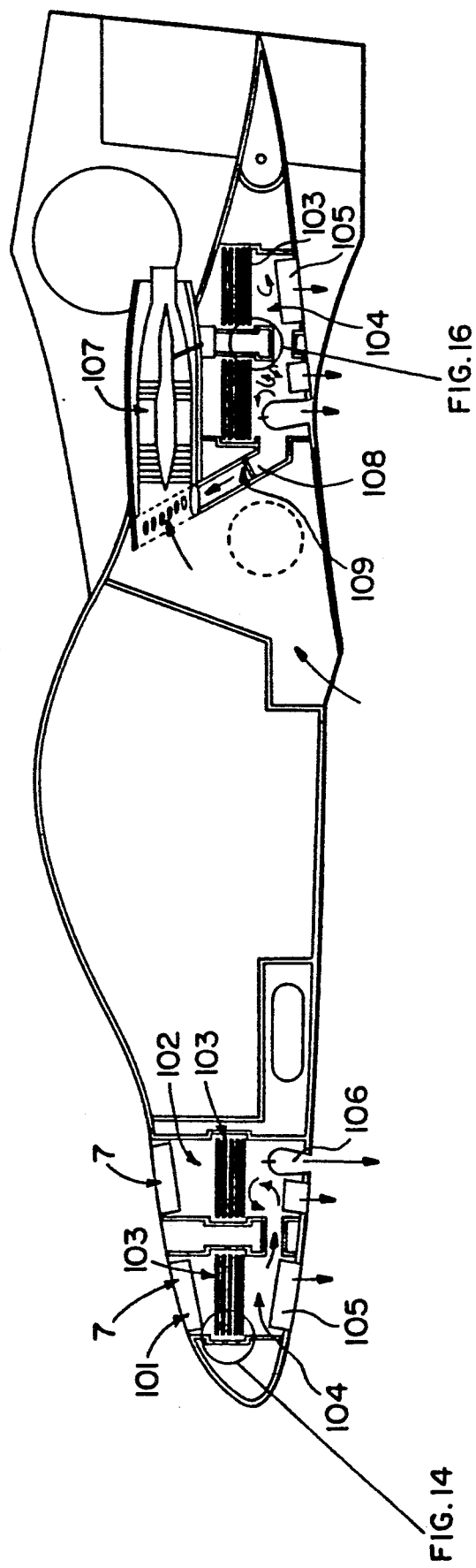
FIG. 12 shows a longitudinal cross section of a turboprop/turbojet engine propulsion configuration at a larger scale than FIG. 4.
Figure 13:
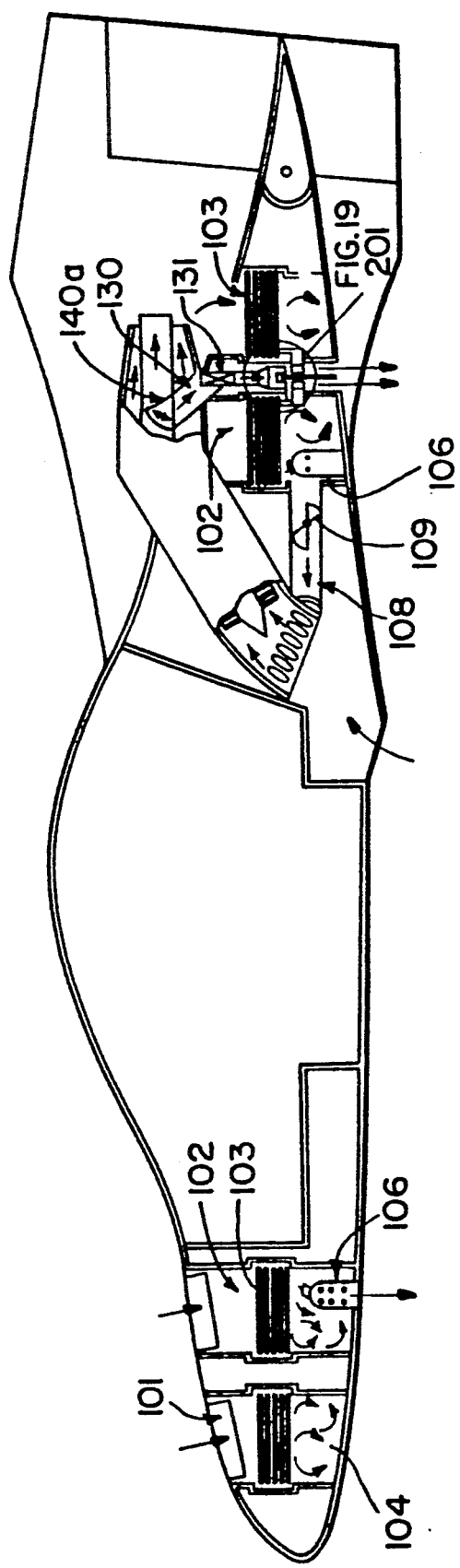
FIG. 13 shows a turbofan/turbojet engine propulsion configuration at a larger scale than FIG. 4.

FIGS. 12 through 20 illustrate all major systems in greater detail. FIG. 12 represents a turbocraft powered by a turboprop engine system where a power is transferred to the turbo-blade system through mechanical means. FIG. 13 represents a turbocraft powered by a turbojet engine system wherein power is transferred to the turbo-blade system through an exhaust manifold system 201. Other propulsion means like low and/or high by-pass ratio turbofan engine systems may be used to propel the instant invention, but for reasons of brevity they are not shown herein. The main concern is not within propulsion systems alone but with all the systems that are involved in the instant invention.

Referring to FIG. 12, outside air enters the system through upper vanes 101 into intake chamber 102, whereupon it enters the multi-stage compressor (turbo-blade system) 103 where it is compressed. At this point it is necessary to clarify the following:

1) FIG. 12 shows a side-by-side axial multi-stage compressor (turbo-blade system) where the inner compressor rotates in one direction counter to the outer compressor, and,
2) No stator stage is shown as part of this presentation, although it is possible to add it to the system.

The stators could convert the kinetic energy of air into additional pressure increasing the efficiency of the compressor (turbo-blade system). A solution similar to the latter indicated for the tandem type multi-stage compressor (see Piston-Propeller propulsion configuration) wherein one of the two rotating systems is fixedly attached to the structural frame, and therefore, remains stationary while the other rotates can be used.

Compressed air exiting the multi-stage compressor enters the compressed air plenum 104. Depending on the flying attitude the compressed air may be used for one or more of the following purposes:

1) to lift the vessel from the ground and help it climb through air by exhausting the highly pressurized air through the open lower vane system, with gate valve 109 closed.
2) to feet the combustion chambers and nozzles (106) located under the vessel (retro-boosting system) while closing the lower vane system (105), closing gate valve 109 and firing the retro-boosting system, in order to attain a much faster rate of climb, and,
3) to feed additional oxygen to the intake chamber of the propulsion system, be it turboprop, turbo-fan or turbojet, while a portion of the upper vane system is open and the lower vane system is closed, through exhaust conduit 109 with gate valve 108 open, in order to attain higher altitudes and cruising speeds.

Figure 15:
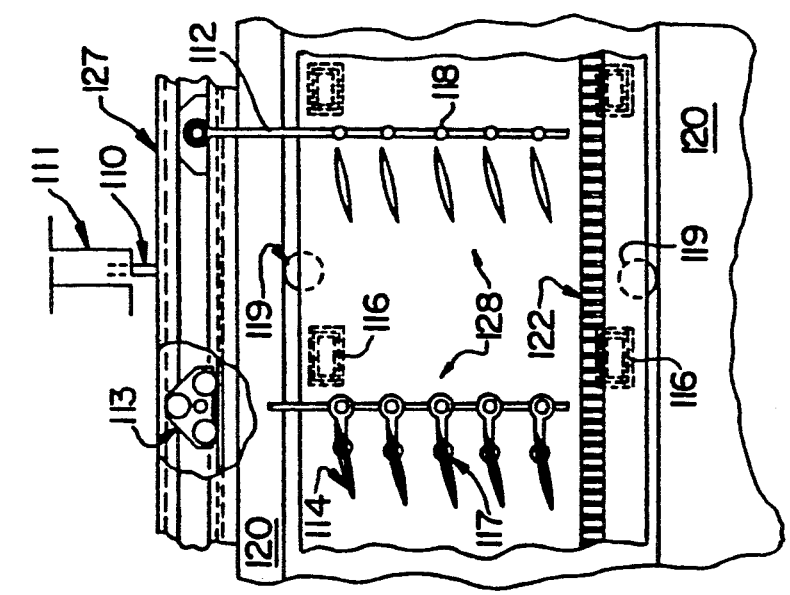
FIG. 15 shows another fragmentary cross section of the turbo-blade system.
Figure 14:
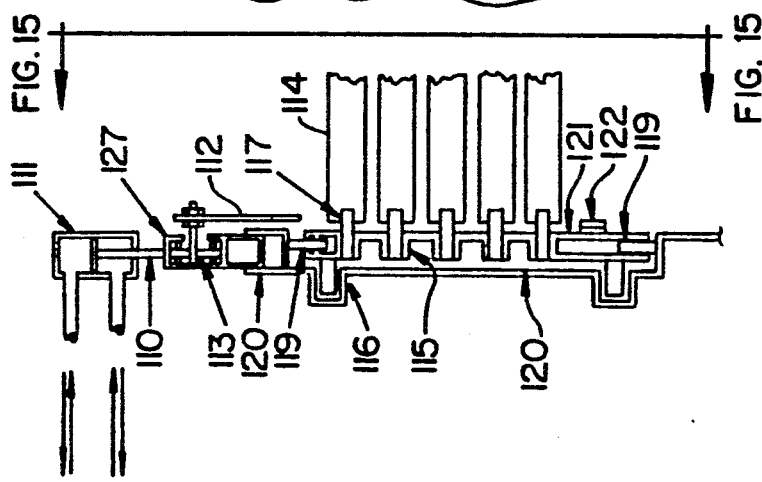
FIG. 14 shows a fragmentary cross section of the turbo-blade system.
Figure 18:
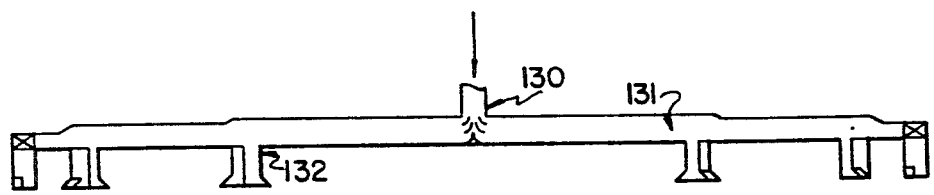
FIG. 18 shows a cross section of the exhaust manifold according to FIG. 17.
Figure 17:
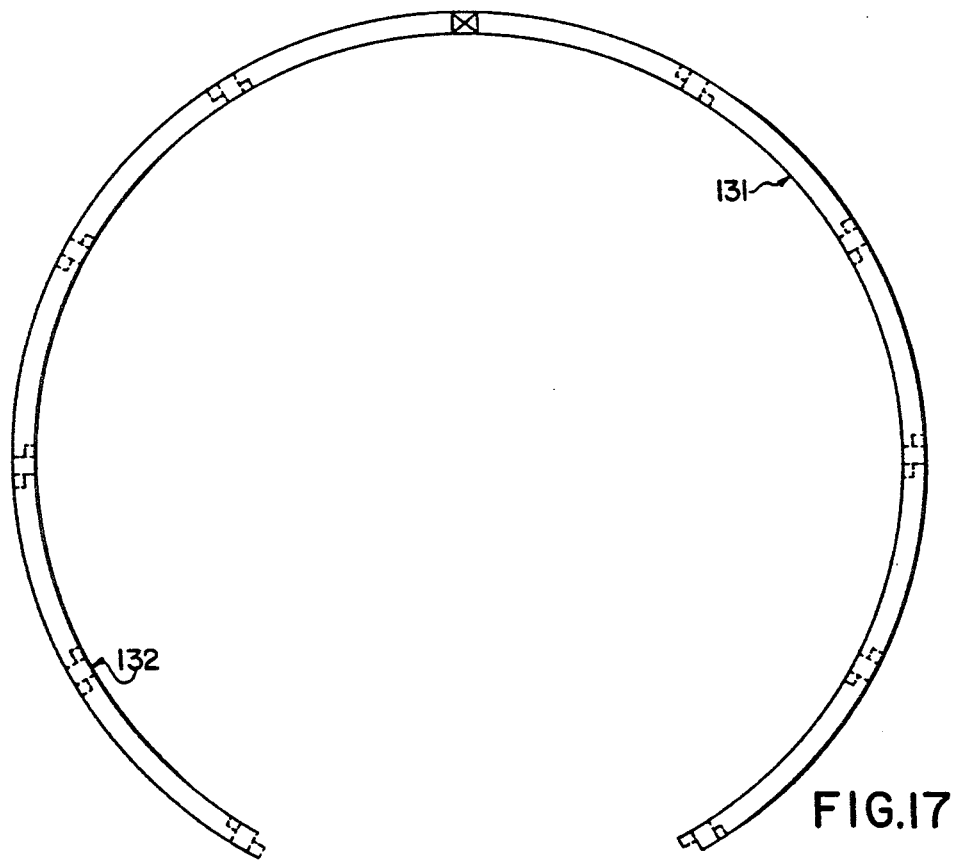
FIG. 17 shows a plan view of an exhaust manifold.

FIGS. 14 and 15 show a detailed arrangement of the turbo-blade system wherein rotatable housing 121 and 128 is connected to fixed housing 120 through roller bearings 116 and 119. Blades 114 are attached to rotatable housing 128 through stub shafts 117 mounted on ball bearings 115 at the ends of each blade. At this point two optional conditions have to be clarified. The are as follows:

1) roll and pitch control to be asserted independently and in addition to all exterior surfaces such as ailerons and tail assembly,
2) roll and pitch control to be obtained only through the action of ailerons and tail.

If condition 1 is to be achieved then the lifting capacity of the turbo-blade system would have to vary around the circumference of the vessel. This is accomplished by varying the angle of attack of the blades around the circumference of the turbo-blade system. A lever (not shown) controlled by the pilot in command feeds hydraulic cylinders 11 located at different stations around the periphery of housing 128, to lower or raise rod and piston 110 a small amount. Rod 110 is fixed to guide 127 designed to be capable of such small vertical movements. Guide 127 contains bearing assembly 113 to which connecting rod 112 is attached. Each blade is connected to rod 112 through connecting pin 118. By raising rod 112 the set of blades at that station would increase its angle of attack and consequently its lifting power, while the set of blades diametrically opposed to that station would reduce its angle of attack and consequently its lifting power. The result of this action would be a rolling effect around an axis perpendicular to a vertical plane containing the two stations. This system may be connected to an automatic pilot system in order to maintain level flight at all times even under hovering conditions.

If condition 2 is to be achieved, then the turbo-blade system is to be directly attached and fixed to the inner housing 128. Due to the gyroscopic effect of the rotating compressor blades, much of the levelling characteristics of the craft will be inherently maintained but the pitch and roll control will have to depend on other sources.

Figure 16:
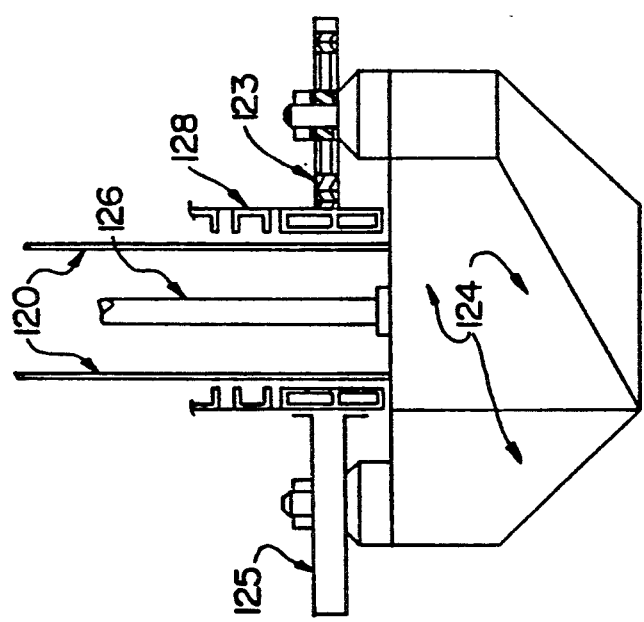
FIG. 16 shows a detail of the mechanical transmission of power to the turbo-blade system.

FIG. 16 shows in greater detail the mechanical transmission of power from the engine compartment through shaft 126 into clutch and transmission box 124. This box has two terminal gears 123 connected to continuous gear 122 fixed to inner housing 128, each gear 123 rotating counter to the other and generating the counter rotating movement of the side-by-side turbo-blade system.

Figure 19:
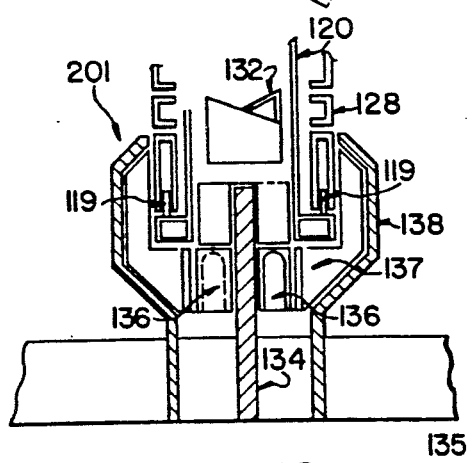
FIG. 19 shows a cross section of the energy transferring exhaust nozzles and blades.
Figure 20:
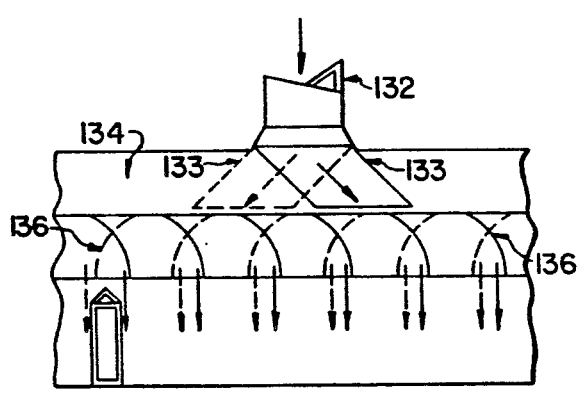
FIG. 20 shows an elevation of the turbo-blade energy transferring exhaust nozzles and blades.

FIG. 13 shows a turbocraft powered by a turbojet engine system wherein power is transferred to the turbo-blade system through an exhaust manifold system. After the turbojet engine system is started the pilot in command will actuate gate valve 140 located in the tail pipe section of the jet engine. At the pilot's discretion a portion of the hot gases is diverted into exhaust main 130 shown in FIG. 18, and then into exhaust manifold 131. From there the hot gases are distributed around the circumference of the manifold through vertical outlets 132 shown in FIGS. 17, 18, 19 and 20. From there the hot gases are diverted into nozzles 133 exhausting in two opposite directions and transferring all its kinetic energy to blades 136 which are fixed through gusset plates 137 to rotatable housings 128 containing the turbo-blade system. Diaphragm 134, strut 135 and housing 138 shown on FIGS. 19 and 20 are a part of the structural frame.

The design and operation of the turbocraft could be summarized into ten basic propulsion-transmission-compression modes as follows:

1) the turbofan-turbojet propulsion/hot gas exhaust manifold transmission mode with retroboosting system and side-by-side compression mode;
2) the turboprop propulsion/hot gas exhaust manifold transmission mode with retro-boosting system and side-by-side compression mode;
3) the turboprop propulsion/mechanical transmission with retro-boosting and side-by-side compression mode;

4) Mode 1, but with tandem type compression in lieu of side by side mode;
5) Mode 2, but with tandem type compression in lieu of side-by-side mode;
6) Mode 3, but with tandem type compression in lieu of side-by-side mode;
7) the reciprocating propulsion/mechanical transmission with retro-boosting and side-by-side compression mode;
8) the reciprocating propulsion/mechanical transmission with retro-boosting and tandem type compression mode;
9) the reciprocating propulsion/mechanical transmission without retro-boosting but with tandem type compression mode;
10) Mode 1, 2, 3 and 7 but with stator blades in the side-by-side compression mode;

The reciprocating propulsion configuration is explained hereinafter as the piston-propellor propulsion configuration.

The operation of the turbocraft under modes 1, 2, 4, 5 and 10 can be summarized as follows: When the pilot in command is ready to initiate the take-off he actuates valve 140a (FIG. 13). connecting the exhausting hot gases with the compressor (turbo-blade system) and increases power to initiate the take-off roll. The roll is required in order not to scorch the tarmac with the vertically exhausting hot gases. In so doing, the upper and lower vane systems are open allowing as much air as possible to flow through the compressor. With the engine system blasting at full power and gate valve 140a set so as to transfer most power to the compressor, the compressor blades gain sufficient speed so that enough pressurized air is generated and exhausted through the lower vanes, and along with the hot gases from the exhaust manifold transmission lift-off is attained. After reaching a prudent altitude, the pilot in command fires the retro-boosting system while at the same time closing the lower vane system and a portion of the upper vanes and setting valve 140a to transfer a higher thrusting power to increase the forward speed of the vessel until the proper rate of climb is attained. Under these conditions an altitude will be reached at which the air density will not allow the engine system to generate sufficient power to keep climbing. At that point the pilot in command closes the retro-boosting system and actuating gate valve 109 diverts enough pressurized air into the jet engine's intake chamber, and in so doing increases the power of the engines until a higher altitude and cruising speeds are attained. At this point the vessel will be flying with a portion of the upper vanes fully open, lower vane system closed, retro-boosting system closed, gate valve 140a partly open, with a low power setting to feed and maintain the compressor delivering enough compressed air to the engines through gate valve 109, and a high power setting for thrusting power. In the landing attitude the procedure will be as follows: As the vehicle approaches its destination, power is reduced, turbo-blade (compressor) deactivated, upper and lower vanes fully closed, gate valve 140a closed to the bypass, and open to thrusting power, gate valve 109 closed so that outside air cannot be diverted into the compressed air plenum and vessel pitch increased until proper gliding speed is attained. As the pattern altitude is reached, upper and lower vanes are opened, power is increased and diverted through valve 140a in order to activate the compressor, valve 109 continues to be closed and retro-boosting system shut and closed. Lifting power is increased and forward speed reduced until pre-determined parameters are reached. At this point the pilot will apply power and/or maneuver the vessel toward the designated landing area, and land substantially in the same way as a helicopter would do. Additional thrust can be provided by means of rocket devices suitably mounted on the aircraft structure. Such rockets could advantageously be powered by liquid fuel or solid fuel, and serve to provide further climbing power to reach higher altitudes.

ANOTHER TURBO-CRAFT VERSION

The Piston-Propeller Propulsion Configuration

The instant invention as described heretofore is energized and propelled by one or more jet engines. However, the use of one or more reciprocating engines to energize and drive the turbo-blade system coupled to one or more propellers for thrusting power in lieu of the jet engine system constitutes another version of the instant version.

FIGS. 7 through 11 show the cabin (51), windshield and windows (52), entrance doors (71), upper and lower vanes (53), propeller protecting shroud (54), tail (55), ailerons (56), winglets (57), yaw control propeller (58), rudder (59), vertical stabilizer (60), propeller (61), pitch control surface (tail) (62), cabin interior (63), passenger seats (64), turbo-blade system (65), landing gear (66), reciprocating engine compartment (67), propeller shaft (68), lower vanes (69), and propeller shaft protecting shroud (70).

Also, FIGS. 21 and 22 show some of these systems in greater detail. FIG. 21 shows the upper vane system in dotted line (101) in the open position. The closed condition is indicated as a solid line following the contour of the wing. Air enters through the upper vane system into the intake chamber (102). It travels through the counter-rotating compressor (turbo-blade system) (141, 143) shown in FIG. 22. These blades are similar in shape as those shown as 117 in FIG. 15, and are supported by shafts 144 mounted on roller bearing 145 at one end and semi-fixed bearings 146 at the other end. Turbo-blade system 143 is attached to rotatable housing 142 and turbo-blade system 141 to rotatable housing 152. These two housings are mounted on inner and outer fixed housings 140 by means of ball bearings 147. These ball bearings being designed to accept a certain degree of resiliency in order to accommodate the centrifugal forces and heat generated by the rotation of the compressor blades (turbo-blade system). Continuous circumferential gear 151 is attached to the outer surface of housing 142 and activated through gear 150 attached to transmission gear 163. Similarly gear 153 is attached to housing 152 and activated through gear 154 in a contour rotating motion. Transmission gear and clutch assembly 163 transfer main power of engine through shaft 165 to transmission gear and clutch assembly 164, and through gear 150 to rotatable housing 147, and, similarly transmission gear and clutch assembly 164 transfer rotating power through shaft 155 to yaw control propeller 160, and through shaft 156 to propeller 157 for thrusting power, and through gear 154 to gear 153 and housing 152.

As air is compressed and exits the turbo-blade systems 141 and 143 it enters the compressed air plenum 104. Similarly to what happens with the turbo-fan or turbojet propulsion configurations, this plenum is connected to the turbo charger of the piston engine through exhaust conduit 149 and possibly to a retro-boosting system (not shown in FIG. 21 for clarity). The function of this plenum is threefold, each one depending on the turbocraft's flying attitude. As explained heretofore, in a take-off attitude the turbocraft would initiate the take-off roll with a small power setting for the thrusting propeller and high engine power diverted to the compressor (turbo-blade system) and with both vane systems fully open. The compressed air would flow through the lower vane system (105) into the open air below with enough pressure to lift the turbo-craft from the ground. As soon as the turbo-craft attains a prudent altitude the retro-boosting system (optional) would be fired and the low vane system would be fully closed. At that point power would be diverted from the retro-boosting system to the thrusting propeller at the command pilot's discretion until the desired rate of climb is attained. In order to reach higher service ceilings than those attained by the present turbocharged piston-propeller aircrafts, the instant invention provides the following innovation. As the turbocraft climbs, additional oxygen is required by the piston engine in order to burn the proper air-fuel ratio and maintain the required power. This is provided by connecting the pre-compressed air from the compressed air plenum through exhaust conduit 149 and valve 148 to the turbocharger attached to the piston engine. By receiving pre-compressed air the turbocharger would be capable of delivering enough oxygen to the piston engine injectors to maintain power at a higher altitude. An additional operation would be required to complement the proper functioning of this system. Because the turbo-craft wing loading is very low, a rather big upper section of the wing could be opened to the air without destroying the flying capacity of the wing. Therefore, a section of the upper vanes would have to be opened to the air so that enough air be handled by the compressor (turbo-blade system) in order to compress the required air volume. The lower vane system would be closed and the retro-boosting system deactivated.

The turbo-blade system shown on FIGS. 7 through 11, 21 and 22 is the tandem type. The operation (climbing, hovering, flying and landing) of this configuration would be similar to that of the turbo-fan and turbojet engine propulsion mode.

An Improved Turbocraft Version

Figure 23B:
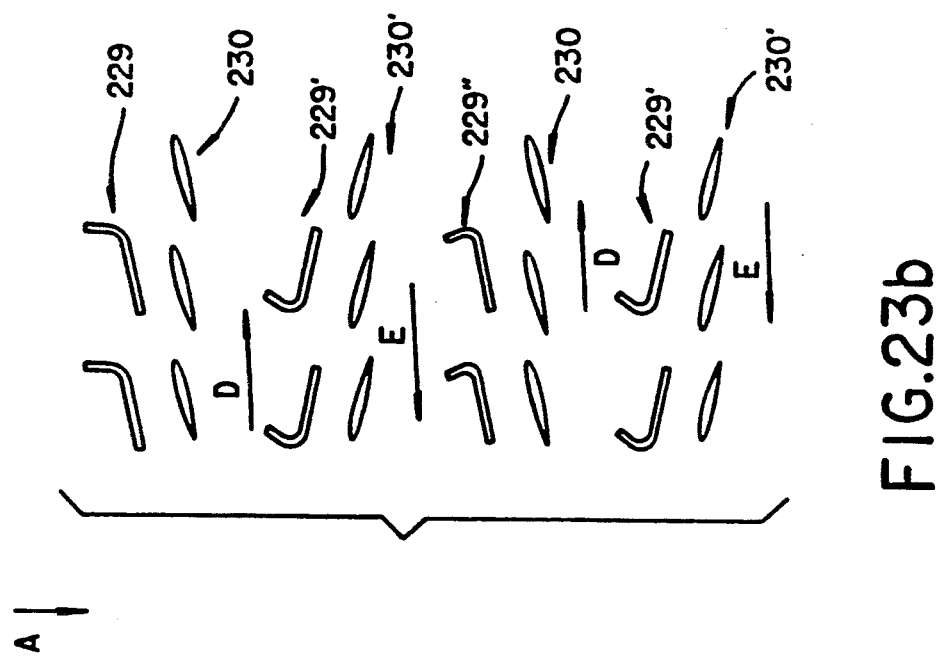
FIG. 23b is a diagrammatic fragmentary detail view of counter-rotating turboblades with intervening stationary blades.
Figure 23A:
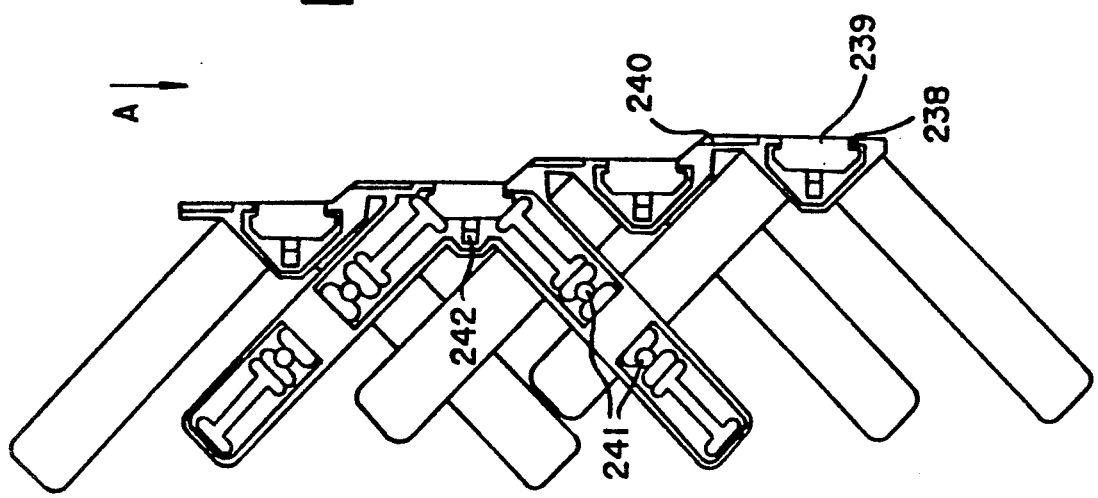
FIG. 23a is a diagrammatic fragmentary, part cross-sectional elevational view of the turboblade assemblies, showing details of the ball bearings supporting the rotating turbo-blades.

FIG. 23a shows details of the counter-rotating turbo-blade assemblies wherein the air stream is flowing downward as shown by arrows A. The reference numerals of all elements shown in FIGS. 23a-29 are all incremented by 200 to distinguish them from elements shown in the preceding figures and disclosure.

In FIG. 23a alternating stator stages 229 and rotating rotor stages 230 are shown drawing air vertically downward in direction of arrows A through the rotating blade assemblies. A rotor assembly is indicated at 239 with an adjacent stator assembly 240. Ball bearings 241 support the perimeter of the rotor assemblies against upward lifting forces and possibly against precisional forces created during changing attitudes of the aircraft. Packings 238 insure against loss of air flow and oil pressure along the perimeter of the rotor assemblies. The rotor assembly operates as a rotary compressor. FIG. 23b shows diagrammatically the individual blades of the rotor assemblies, wherein blades 229 are stator blades, followed in downward direction by rotor blades 23 turning in direction indicated by arrow D, followed again by a set of stator blades 229' followed by rotor blades 230' moving in direction indicated by arrow E, again followed by stator blades 229", rotor blades 230 moving in direction D, and stator blades 229', and rotor blades 230 moving in direction E.

Figure 24:
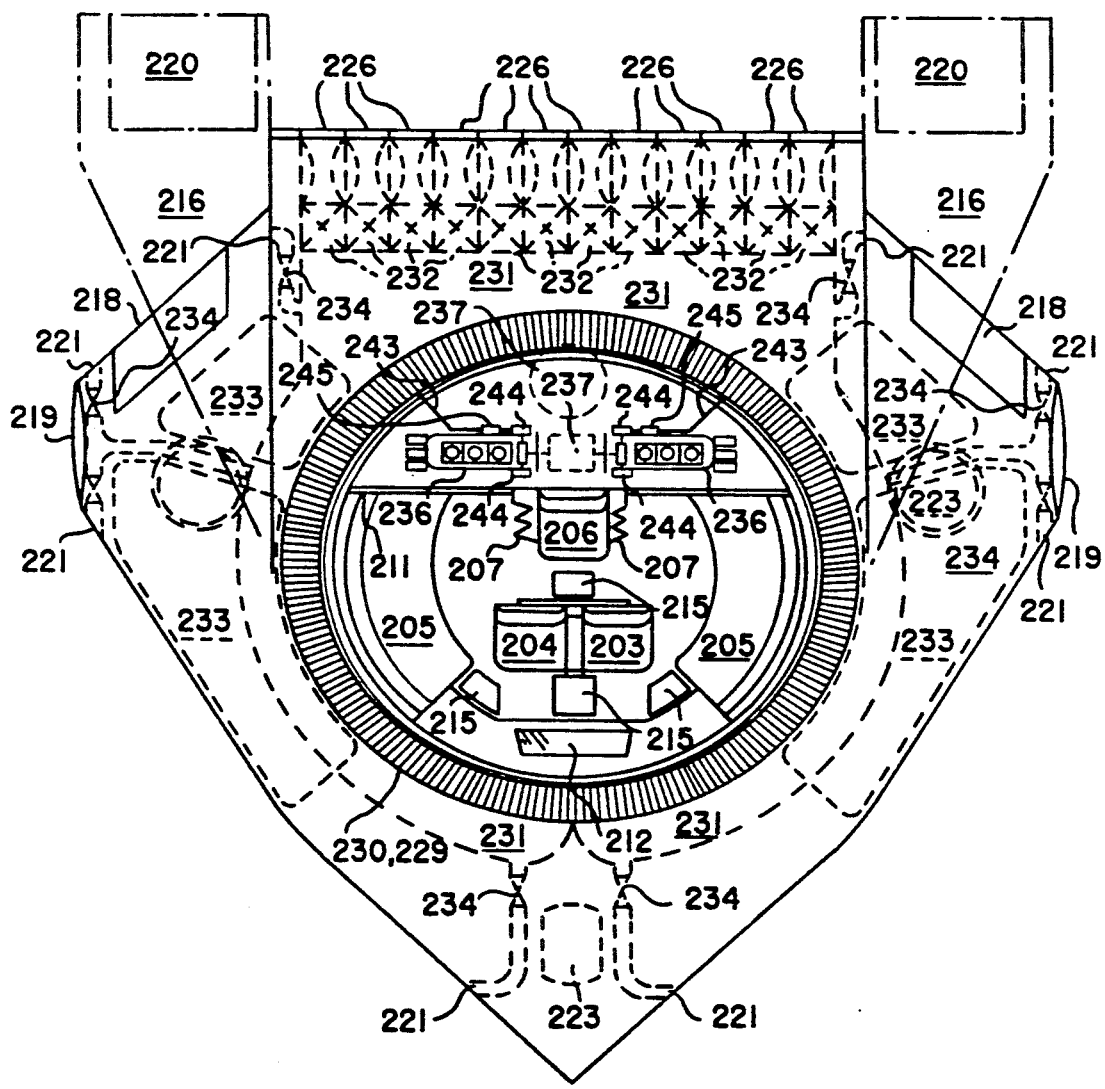
FIG. 24 is a plan top-down view of the aircraft in a version having a plurality of rearward-facing exhaust air nozzles.
Figure 25:
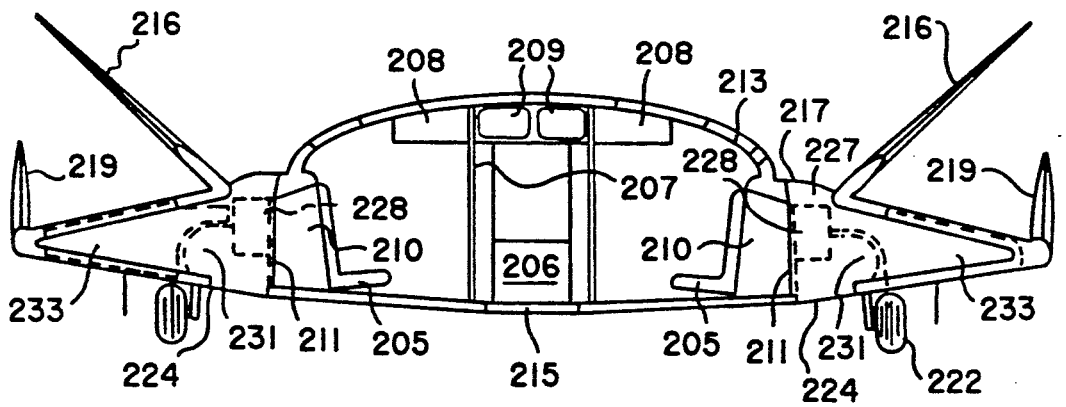
FIG. 25 is an elevational, cross-sectional view of the invention according to FIG. 24 seen from the front.

FIGS. 24 and 25 show respective cross-sectional top-down and front views of the invention with the major internal parts indicated in phantom lines. The cabin interior 201 holds pilot seats 203, 204, with an instrument panel 212 in front of them, and a cabin floor window in front and behind them.

Passenger seats 205 are positioned inside the turbo-blade assemblies 229, 230, e.g. in the form of semi-circular seats. A pantry and refrigerator space 208 is located behind the pilot seats 204, 203.

The engines 236 are located in the rear section of the cabin area. The engines may be reciprocating engines, turbojet engines, or turboshaft engines. A transmission gear 237 is coupled by suitable means such as gear wheels or hydrostatic transmission to the turboblade rotor assemblies 229,230 to maintain their rotation during flight. In case the engines are reciprocating engines they may be equipped with turbochargers 244 to boost engine power when needed for climbing or flight at high altitudes.

A washroom 206 is located immediately behind the pilot's seats, enclosed in folding doors 207. Cabin windows 209 are located at the rear of the cabin 201. Luggage space 210 is provided behind the passenger seats 205.

A firewall 211 separates the cabin 201 from the engine room 235, the turboblade assembly (compressor) 228 and the compressed air plenum 231.

A plurality of horizontal exhaust flap valves 232 operate to control a rearward downward air stream from the air plenum to provide forward propulsion of the aircraft.

A pair of stabilizers 216 provide horizontal stability of the aircraft, and have each a conventional rudder 220 attached to the trailing edges of the stabilizers 216.

Figure 29:
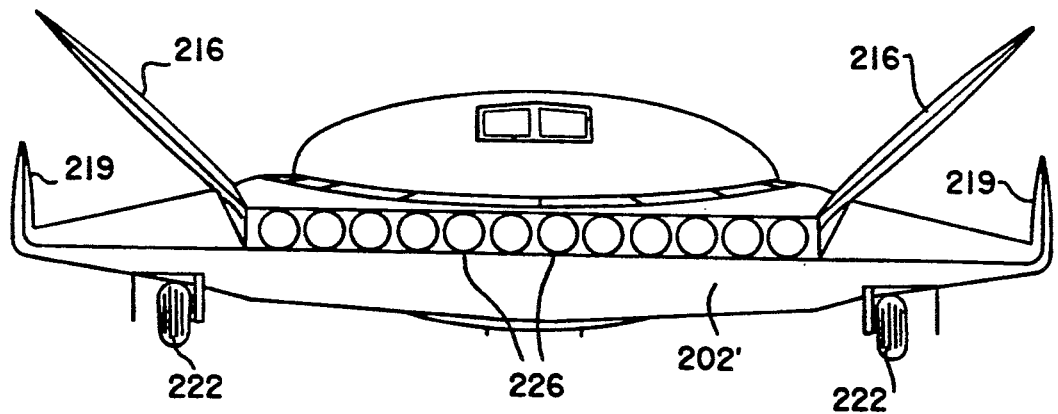
FIG. 29 is an elevational rear view of the invention according to FIG. 28, showing rearward facing exhaust air nozzles.

A plurality of intake air vanes 217 are positioned in the top surface of the aircraft, as seen in FIG. 26. The vanes are controllable by control linkage from the pilot's seats as described above. As seen in FIGS. 26,27 and 29 the entire upper surfaces 202 of the aircraft combine with the bottom surfaces 202' to form a profile like an airplane wing in the direction of flight of the aircraft. The rear edges of the aircraft body have pivotable ailerons 218, controlled in conventional manner from the pilot's seat in order to bank the aircraft or maintain proper attitude during turns.

Upstanding winglets 219 are provided at respective extreme points at the sides of the aircraft to provide improved wing efficiency. Controllable, directional control nozzles 221 are provided at various points along the perimeter of the aircraft body for controlling yaw, pitch and roll of the aircraft at all attitudes and at all times during flight and also during hovering. The directional control nozzles 221 are in fluid communication with a compressed air plenum 231 disposed below the rotating turboblade assemblies. The air plenum 231 receives the downward compressed air stream, from where the compressed air is distributed to perform various functions relating to the operation of the aircraft as described below.

Figure 28:
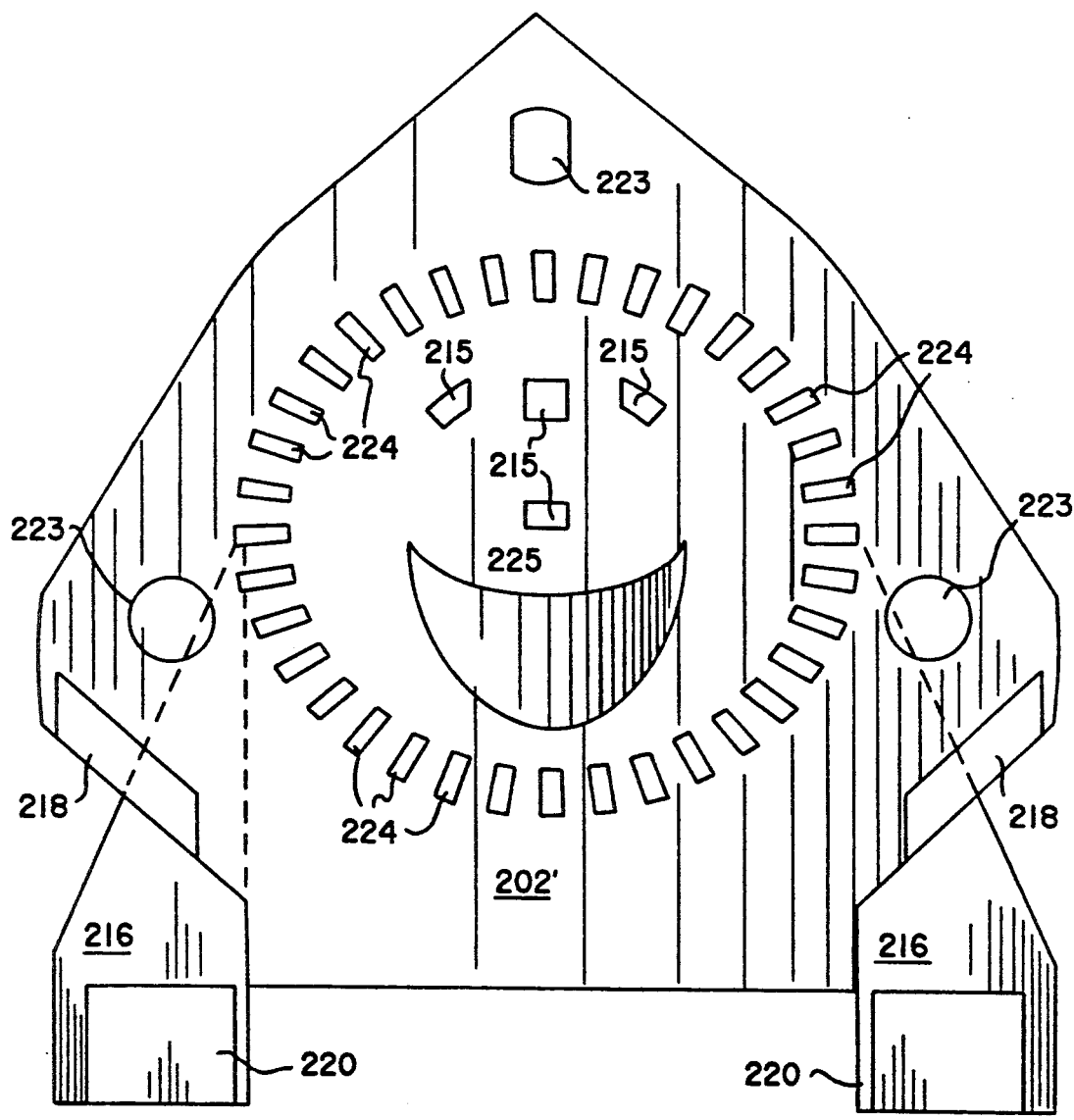
FIG. 28 is a plan view of the invention seen from the bottom up, showing bottom surface details and radially oriented lower exhaust air vanes.

Part of the compressed air can be released through lower exhaust air vanes 224, best seen in FIG. 28, which are controlled from the pilots' seats in such a way that the aircraft is controlled in various modes. For example, opening the air vanes 224 to direct the outgoing air stream downward imparts a lifting thrust to the aircraft. By allowing the air stream to flow directly downward, a lifting force is generated.

By directing part of the air stream from the plenum to selected ones of the directional control nozzles 221 which are fixedly mounted in different directions or can be vectored in different directions by means of control available to the pilot in command, the aircraft can be turned about any of the three axes for which purpose directional control valves 234 are provided. The details of the vectoring arrangement are now shown for the sake of clarity.

Retractable landing gear including a nose wheel 223 and two mains wheels 222 are provided for maneuvering the aircraft on the ground.

An engine air intake 225 is provided at the bottom of the aircraft for supplying the engines 236 with air.

A plurality of rearward-facing exhaust air nozzles 226 on the rear side of the aircraft provide forward thrust for the aircraft by means of air supplied by the plenum 231, under control of the horizontal exhaust flap valves 232.

Fuel cells 233, best seen in FIGS. 24 and 25 are located in the low profile parts of the aircraft body. For combustion of the fuel in the engines 236, compressed air is taken from the air plenum 231 via a compressed air line 243 to air coolers 245 before it enters the engines 236.

In operation of the aircraft the compressed air in the plenum 231 is directed either downward to provide lift or backward to provide forward thrust, or the air can be divided between the downward and backward direction to provide both lift and forward motion. An amount of the compressed air from the plenum is directed to the engines' air intakes to provide air for the combustion in the engines. During normal horizontal flight the compressed air is exhausted via the rearward facing nozzles 226. These rearward facing nozzles can be adjustable so that all or part of the forward thrust can be derived from these nozzles, optionally augmented by a propeller (or propellers) driven by the engine(s) 236.

In case a turbofan engine is used to power the aircraft, part of the compressed air from the plenum is used to feed the combustion in the engine(s), and part of the air may be used to by-pass the engines as is known from the conventional turbofan engine, although in the present case the bypass air will be pre-compressed. In case turbo engines are used, their forward-facing air intakes operate to provide additional air pressure due to the ram-effect.

The instant invention has been shown and described herein in what is considered to be the most practical and preferred embodiment. It is recognized, however, that departures may be made therefrom within the scope of the invention and that obvious modifications will occur to a person skilled in the art.

In summary the instant invention is based on a process of utilizing the energy delivered by the power generating means to improve those in use by the present state of the art whereby:

1. Air enters the system through controllable openings placed in the body of the aircraft and is transferred to a compressor.
2. This compressor can be structured with features as any of the following:

2a. Type: Axial, radial, centrifugal, toroidal, reciprocating or any other type known to date;
   2b. Position: Vertical, horizontal, inclined or any position that would perform the function required by design the construction of the aircraft;
   2c. Location: Attached to the outside of the aircraft or within its body;
   2d. Number: Any number required to provide the required air pressure;
   2e. Configuration: Rotating, counter-rotating, with or without stators, with airfoil design blades or any other shape required, including one stage or multiple stages.

The compressed air is delivered from the compressor into a plenum.

3. This plenum may, depending upon control settings, deliver the compressed air as required to:

3a. the bottom of the aircraft and into the air below, to effect the required thrust in order to attain lift, descent or a hovering attitude;
   3b. the rear of the aircraft and into the air behind it in order to effect a forward movement;
   3c. the power generating means in order to maintain the help maintain the required air-fuel mixture;
   3d. combustion chambers directed downward or rearward in order to increase the lifting and/or forward movement of the aircraft;
   3e. the directional control system in order to maintain the proper directional control or to effect various maneuvers of the aircraft;
   3f. any additional system or systems wherein compressed air may be required, through controllable openings having the required designed shapes.

In addition, air may be diverted from the exhaust of power generating means to aid in directional control, lifting control and thrusting control of the aircraft.

Furthermore, the power generating means may be of any type known at the present state of the art such as reciprocating, turboshaft, turbojet, fanjet, rocket, electromagnetic or nuclear and the like, and may be positioned at any location attached to or within the body of the aircraft and directed in any way required to perform the required functions.

The instant invention has been shown and described herein in what is considered to be the most practical and preferred embodiments. It is recognized, however, that departures may be made therefrom within the scope of the invention and that obvious modifications will occur to a person skilled in the art.

I claim:

1. An aircraft comprising a substantially circular body having a profile in the direction of flight as a profile of an airplane wing, at least two concentric counter-rotating turbo-blade assemblies disposed within said body for effecting a vertical lifting air stream through said assemblies, power generating means having an intake portion, means for coupling said power generating means to said turbo-blade assemblies for maintaining them in rotary motion, thrusting means coupled to said power generating means for applying horizontal thrust to said aircraft, retro-boosting means including a plurality of combustion chambers disposed proximal to said turbo-blade assemblies for boosting said vertical lifting airstream, a compressed air plenum in fluid communication with said combustion chambers and with the intake portion of said power generating means for supplying oxygen for sustaining combustion in said combustion chambers and for sustaining power in said power generating means, upper vanes disposed above said turbo-blade assemblies for ingesting air, and lower vanes disposed below said compressed air plenum for exhausting air, and respective upper and lower vane control means.

2. Aircraft according to claim 1 including means for injecting fuel into said combustion chambers, and means for igniting a compressed fuel-air mixture in said combustion chambers.

3. Aircraft according to claim 1, wherein said means for coupling said power generating means include gear wheel assemblies having drive input and drive output respectively engaging said power generating means to said turbo-blade assemblies.

4. Aircraft according to claim 1, including at least one jet engine system in said power generating means, wherein said means for coupling said power generating means include a gate valve disposed in a tail pipe section of said jet engine system for diverting a portion of jet engine exhaust gases, a circular exhaust manifold in fluid communication with said gate valve, and a plurality of nozzles disposed along said circular exhaust manifold for projecting said portion of jet engine exhaust gases toward blades disposed on said turbo-blade assemblies.

5. Aircraft according to claim 1, including a propeller in said horizontal thrusting means, wherein said power operating means include a power shaft coupled to said propeller.

6. Aircraft according to claim 4, wherein said horizontal thrusting means include an exhaust gas manifold in fluid communication with said jet engine system for effecting a horizontal thrust in said aircraft.

7. Aircraft according to claim 1, including a plurality of radially extending rotor blades on said turbo-blade assemblies disposed circumferentially on said turbo-blade assemblies, and rotating means for rotating said rotor blades about a radially extending axis for controlling said vertical lifting airstream.

8. Aircraft according to claim 7, including rotor blade control means, wherein said turbo-blade assemblies are divided into sectors defined by planes through said vertical axis, and steering means coupled to said rotor blade control means for independently controlling said rotating means in each of said sectors for controlling pitch and roll of said aircraft.

9. Aircraft according to claim 1, wherein said at least two counter-rotating turbo-blade assemblies are stacked vertically separated from one another.

10. Aircraft according to claim 1, wherein said at least two counter-rotating turbo-blade assemblies are disposed concentrically within at least one common plane perpendicular to the vertical axis of the circular body.

11. Aircraft according to claim 10, including at least two stator-blade assemblies fixed to the aircraft structure, disposed under said counter-rotating blade assemblies for redirecting the airstream.

12. Aircraft according to claim 11, wherein each rotating blade of said turbo-blade assemblies is supported at each end.

13. Aircraft according to claim 1, including wings extending radially from said substantially circular body, ailerons pivotally attached to said extensions, and winglets extending vertically at an angle from the ends of said wings.

14. Aircraft according to claim 1, including horizontal stabilizing surfaces disposed at the rear of said substantially circular body, elevator means pivotally attached to said stabilizing surfaces, and rudder means attached at the rear of said substantially circular body.

15. Aircraft according to claim 3, including a yaw control propeller disposed in a vertical plane, and coupling means for variably coupling said yaw control propeller to said power generating means.

16. Aircraft according to claim 4, including exhaust nozzles in said motion control means, disposed at the periphery of said circular body, and means to control said exhaust nozzles.

17. Aircraft according to claim 1, including a rocket system disposed at the rear of said aircraft to increase said horizontal thrusting power, and means to control said rocket system.

18. Aircraft according to claim 1 including at least one reciprocating engine in said power generating means.

19. An aircraft having an aircraft body having a profile in direction of flight as a profile of an airplane wing, comprising at least two counter-rotating turboblade assemblies within said body for effecting a vertical lifting air stream through said assemblies; power generating means; coupling means for coupling said power generating means to said turboblade assemblies for maintaining them in rotary motion; thrusting means coupled to the power generating means for applying horizontal thrust to the aircraft; a compressed air plenum disposed downstream of said turboblade assemblies in fluid communication with said power generating means for supporting combustion in said power generating means; a plurality of rearward facing exhaust air vanes in fluid communication with said compressed air plenum for imparting forward thrust to the aircraft; a plurality of adjustable lower exhaust air vanes in fluid communication with said compressed air plenum for selectively imparting lifting and forward thrust to the aircraft; a plurality of upper vanes for ingesting air to said turboblade assemblies; and control means for controlling said upper and lower vanes and said rearward facing nozzles.

20. An aircraft according to claim 19, having a retroboosting arrangement which includes at least one combustion chamber having a compressed air intake in fluid communication with said compressed air plenum, fuel-injection means for creating a combustible fuel-air mixture in said combustion chamber, ignition means for igniting said combustible fuel air mixture, and a downward and/or rearward facing exhaust nozzle for expelling combusted fuel-air mixture for creating increased lift and/or horizontal thrust.

21. An aircraft according to claim 19 including a plurality of directional control nozzles disposed at selected points at the periphery of said aircraft body, said directional control nozzles in fluid communication with said compressed air plenum, and control valves in said directional nozzles for controlling airborne attitude of said aircraft.

22. An aircraft according to claim 21, having a pilot's position including means for vectoring said control nozzles and including nozzle control linkage connecting the pilot's position with said control nozzles.

23. An aircraft comprising: a body having a profile in direction of flight as a profile of an airplane wing; a part of the body having a plurality of air intake openings; at least one air compressor in said body having an air inlet fluidly communicating with said air intake openings and an outlet; a compressed air plenum having an air intake port fluidly communicating with said outlet of the air compressor; a plurality of rearward facing exhaust openings rearward facing from said body fluidly communicating with said air plenum for effecting horizontal thrust of said aircraft; a plurality of bottom air exhaust outlets fluidly communicating with said air plenum; power generating means drivingly coupled to said air compressor having combustion air intake ports fluidly communicating with said air plenum; a plurality of control air outlets disposed at selected points of the periphery of said body fluidly communicating with said air plenum for controlling airborne attitude of said aircraft; and control linkage for controlling air flow at said air intake openings, said rearward facing exhaust openings, said combustion air intake means, said control outlets and said bottom air exhaust outlets.

24. A method of controlling an aircraft having a body with a profile in direction of flight like an airplane wing, a compressor in the body receiving airflow from air intake openings in the body, a compressed air plenum receiving air from the air intake openings, a power generator coupled to the compressor, the method which comprises the steps of:

driving the compressor with the power generator;

drawing air into the compressor from the air intake openings;

compressing with the compressor air in the compressed air plenum;

exhausting air from the air plenum through rearward facing exhaust openings for generating thrust to the aircraft;

exhausting air from the air plenum through bottom openings in the body for generating lift to the aircraft;

exhausting air from the air plenum to the power generator for sustaining combustion in the power generator;

exhausting air through control air outlets for controlling airborne attitude of the aircraft; and controlling with control linkage the flow of air from said air intake openings, air flow to said power generating means, said bottom exhaust outlets, said rearward facing exhaust openings and said control air outlets.

* * * * *